Dec. 18, 1923.  
J. R. LOWREY  
HOSE CLAMP  
Filed Dec. 9, 1920  
1,477,573

Inventor:—
John R. Lowrey,
By Hazard & Miller
attys.

Patented Dec. 18, 1923.

1,477,573

UNITED STATES PATENT OFFICE.

JOHN R. LOWREY, OF SAN PEDRO, CALIFORNIA.

HOSE CLAMP.

Application filed December 9, 1920. Serial No. 429,538.

*To all whom it may concern:*

Be it known that I, JOHN R. LOWREY, a citizen of the United States, residing at San Pedro, in the county of Los Angeles and State of California, have invented new and useful Improvements in Hose Clamps, of which the following is a specification.

My invention relates to new and useful improvements in hose clamps, the principal objects of my invention being to provide relatively simple and efficient means for connecting a flexible tube such as a hose to a short nipple, one end of which latter is threaded in order that it may be readily seated in a threaded opening; further, to provide a clamp having relatively few parts thereby permitting the device to be easily and cheaply produced, and further, to generally improve upon and simplify the construction of the existing types of hose clamps.

With the foregoing and other objects in view, my invention consists in certain novel features of construction and arrangement of parts that will be hereinafter more fully described and claimed, and illustrated in the accompanying drawings, in which:

Figure 1:
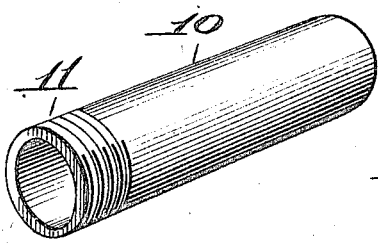
Fig. 1 is a perspective view of a nipple that forms the main body portion of my improved hose clamp.
Figure 2:
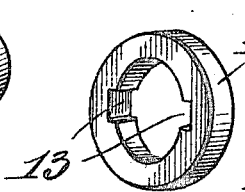
Fig. 2 is a perspective view of a ring or collar that is rigidly clamped upon the nipple.
Figure 3:
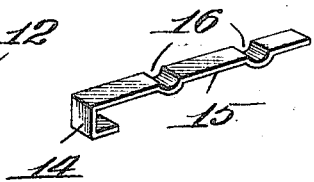
Fig. 3 is a perspective view of one of the hose retaining clamps forming a part of my invention.

Referring by numerals to the accompanying drawings, which illustrate a practical embodiment of my invention, 10 designates a nipple that is formed of a short section of metal tubing, one end of which is externally threaded, as designated by 11. Arranged upon this nipple adjacent to the threaded portion 11 thereof is a ring or collar 12 having formed in its inner periphery at diametrically opposite points notches 13 that are adapted to receive the inner portions of hooks 14 that are formed on the ends of hose engaging straps 15, and which latter are transversely corrugated at two or more points to form retaining wire receiving notches or recesses 16. These members 15 may be in the form of flat straps as illustrated in Fig. 3, or they may be formed from short sections of wire.

Figure 6:
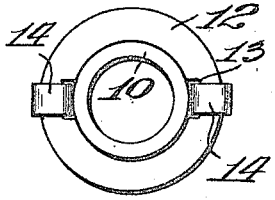
Fig. 6 is an elevational view of the parts of the clamp in assembled relation and before the ring or collar is pressed on the nipple.
Figure 7:
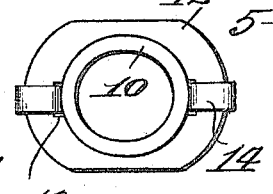
Fig. 7 is an elevational view of the assembled parts as they appear after the ring or collar has been clamped upon the nipple.
Figure 4:
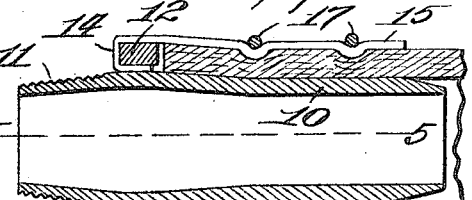
Fig. 4 is a horizontal section taken lengthwise through the center of a clamp of my improved construction, and showing the same applied to the end of a hose.
Figure 5:
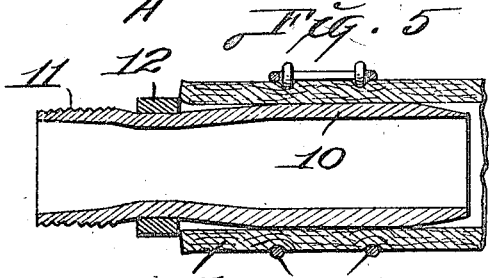
Fig. 5 is a horizontal section taken approximately on the line 5—5 of Fig. 4.

In the manufacture of the clamp, collar 12 is positioned on nipple 10 adjacent to the inner end of thread 11 and with the hooks 14 of the members 15 engaged in notches 13. When so assembled the parts appear as illustrated in Fig. 6, and to clamp the ring 12 on nipple 10 suitable deforming pressure is applied to ring 12 at oppositely disposed points thereon, and at right angles to the plane occupied by the members 15, and said ring is pressed into substantially oval shape, as illustrated in Fig. 7, which action necessarily distorts the nipple 10, giving it a substantially horizontal oval shape, and firmly clamping the hooks 18 in the notches 13.

When the device thus constructed is applied to the end of a hose such as A, the tubular body of the nipple 10 is inserted in the end of the hose, and a suitable tie wire or clamp 17 is positioned around the hose and drawn tightly into the notches or recesses 16 in members 15, thereby very securely connecting the hose to the device.

Figure 8:
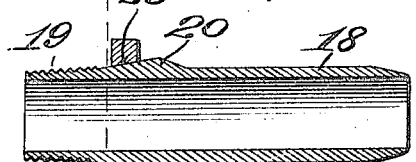
Fig. 8 is a longitudinal section taken through the center of a modified form of my improved hose clamp.
Figure 9:
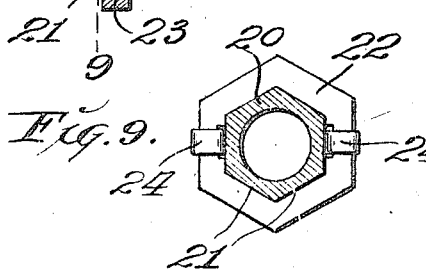
Fig. 9 is a cross section taken on the line 9—9 of Figure 8.

In the modified construction illustrated in Figs. 8 and 9, the nipple 18 has formed on its periphery adjacent to its threaded end 19 an enlarged hexagonal portion 20, the faces 21 thereof being inclined. Adapted to be driven on to this tapered hexagonal portion 20 is a hexagonal ring or washer 22, the inner faces 23 of the opening in which are inclined or bevelled to the same angle as the inclined faces 21, and when this ring is driven on to the portion 20, the parts will be very firmly secured to each other and a substantially one-piece structure is produced.

The modified structure includes straps or hose engaging members 24 that are provided with hooks on their forward ends, and which latter are engaged in suitable notches formed in the ring or washer 22.

A hose clamp of my improved construction is comparatively simple, comprises relatively few parts, thereby permitting it to be easily and cheaply produced, and said clamp is constructed so that it can be easily and quickly applied to the end of a hose without the use of special tools, and when properly connected to the hose it provides strong, durable and efficient means for detachably connecting said hose to a section of tubing or an object such as a faucet, nozzle, tank or container.

Minor changes in the size, form and construction of the various parts of my improved hose clamp may be made and substituted for those herein shown and described without departing from the spirit of my invention, the scope of which is set forth in the appended claims.

I claim as my invention:

1. In a hose clamp, a nipple, a separately formed collar adapted to be seated by deformation and thereby clamped thereupon adjacent to one end and hose engaging members clamped to said collar and lying substantially parallel with the body of said nipple.

2. In a hose clamp, a separately formed nipple, a collar adapted to be seated by deformation and thereby clamped thereupon adjacent to one end, and hose engaging straps clamped to said collar and lying substantially parallel with the axis of the nipple, said straps being provided with transversely disposed recesses adapted to receive hose tie members.

3. In a hose clamp, a nipple, a separately formed collar adapted to be seated by deformation and thereby clamped thereupon adjacent to one end and provided with internally arranged notches, and hose engaging straps having rebent portions at one end seated in the notches of said collar.

4. In a hose clamp, a nipple and a separately formed collar adapted to be seated by deformation and thereby clamped thereupon adjacent to one end, which collar is notched in order to receive hose engaging straps.

5. In a hose clamp, a nipple, a separately formed collar adapted to be seated by deformation and thereby clamped thereupon adjacent to one end, and hose engaging members clamped between said collar and nipple.

6. In a hose clamp, a nipple, a separately formed collar adapted to be seated by deformation and thereby clamped thereupon adjacent to one end, hose engaging members clamped between said collar and nipple, and said hose engaging members being provided with transversely disposed recesses that are adapted to receive hose tie members.

7. In means for attaching a nipple to hose, a deformable collar provided with notches and adapted to be seated by deformation adjacent to the threaded portion of said nipple, and members adapted to extend longitudinally of said nipple and provided with hooks adapted to be seated in said notches.

8. In means for attaching a nipple to hose, a deformable collar provided with notches and adapted to be seated by deformation adjacent to the threaded portion of said nipple, and members adapted to extend longitudinally of said nipple and provided with hooks adapted to be seated in said notches and also provided with recesses.

9. In means for attaching a nipple to hose, a deformable collar provided with notches and adapted to be seated by deformation adjacent to the threaded portion of said nipple, members adapted to extend longitudinally of said nipple and provided with hooks adapted to be seated in said notches, and clamping means engaging said members and said hose.

10. A nipple provided with attaching means for connecting it to a hose by circumferential clamps, said attaching means comprising a collar seated adapted to be secured by deformation adjacent the thread on said nipple, said collar being provided with notches, and rebent hose engaging straps seated in said notches.

In testimony whereof I have signed my name to this specification.

JOHN R. LOWREY.